(12) United States Patent  
Engelholm

(10) Patent No.: US 6,389,963 B2  
(45) Date of Patent: May 21, 2002

(54) PEELING ELEMENT

(75) Inventor: Torbjörn Engelholm, Närpes (FI)

(73) Assignee: Oy Formit Foodprocessing AB (FI)

( * ) Notice: Subject to any disclaimer, the term of this patent is extended or adjusted under 35 U.S.C. 154(b) by 0 days.

(21) Appl. No.: 09/761,761

(22) Filed: Jan. 18, 2001

(30) Foreign Application Priority Data

Feb. 9, 2000 (FI) .............................................. 20000270

(51) Int. Cl.[7] ................................................. A23N 7/02
(52) U.S. Cl. .............................. 99/617; 99/623; 99/625; 99/628
(58) Field of Search .......................... 99/612, 613, 614, 99/617, 623, 624, 625, 628, 629, 609

(56) References Cited

U.S. PATENT DOCUMENTS

| | | | | |
|---|---|---|---|---|
| 2,161,237 A | * | 6/1939 | Skliris ........................... | 99/628 |
| 2,454,015 A | * | 11/1948 | Sheppard ...................... | 99/628 |
| 3,602,280 A | | 8/1971 | Hill et al. ...................... | 99/625 |
| 4,068,574 A | * | 1/1978 | Amstad | |
| 4,827,836 A | | 5/1989 | Neidigh ........................ | 99/625 |

FOREIGN PATENT DOCUMENTS

| | | |
|---|---|---|
| AU | B-50267/93 | 5/1994 |
| EP | 0 322 252 | 6/1989 |
| EP | 0 583 569 | 2/1994 |
| FI | 100633 | 1/1998 |
| RU | 1779319 A1 | 12/1992 |
| SE | C2 510 578 | 6/1999 |

* cited by examiner

*Primary Examiner*—Reginald L. Alexander  
(74) *Attorney, Agent, or Firm*—Nixon & Vanderhye P.C.

(57) ABSTRACT

The present invention relates to a peeling element having an elongated shape and being attached to a mechanism for rotating the peeling element around a rotation axis and includes peeling arrangements on an outer surface. To allow a product to be peeled with a single peeling device, on a first part of the peeling element, the outer surface includes a rough scraping surface, and on a second part of the peeling element, the outer surface includes at least one cutting surface.

11 Claims, 2 Drawing Sheets

PEELING ELEMENT

BACKGROUND AND SUMMARY OF THE INVENTION

The present invention relates to peeling peelable products, such as potatoes.

It is previously known to utilize cutting means, such as knives in peeling devices to peel a product. However, these known knife peelers have the drawback that they are unsuitable for peeling a product in a single step. This is because knives are sensitive to sand and other impurities that may be present when potatoes, for example, are peeled. When a product is peeled in one step using such a knife peeler, the knives become blunt quite rapidly and thus have to be replaced.

To avoid constant replacement of knives in a knife peeler, it is known to carry out the peeling with two different peeling devices of which the latter is a knife peeler. In this case the first peeling device is a peeling element having a rough scraping surface. The rough scraping surface of the peeling element provides the first peeling step. In the first peeling step, impurities, such as sand, are removed. After the first peeling step, the product is conveyed to a second peeling device, which is a knife peeler. The knife peeler thus finishes the peeling of the product without its knives coming into contact with sand or the like impurities. The drawback in this known solution is, however, that the peeling of a product requires two different peeling devices, which increases the costs of the peeling apparatus and, moreover, the peeling apparatus requires a relatively large space.

The object of the present invention is to solve the above problems. This is achieved with a peeling element having an elongated or rod-like shape and being attached to means for rotating the peeling element around a rotation axis and comprising peeling means on an outer surface. The peeling element of the present invention is characterized in that on a first part of said peeling element said outer surface comprises a rough scraping surface, and that on a second part of said peeling element said outer surface comprises at least one cutting means.

The object of the present invention is also achieved with a peeling device comprising: at least a pair of adjacent peeling elements having a rod-like shape and being attached to means for rotating the peeling elements around rotation axes, the outer surfaces of the peeling elements comprising peeling means. The peeling device of the invention is characterized in that on a first part of the peeling elements the outer surface of the peeling elements comprises a rough scraping surface, and that on a second part of the peeling elements the outer surface of the peeling elements comprises at least one cutting means.

The invention is based on the idea of utilizing a peeling element capable of peeling with both a rough scraping surface and a cutting means. Such a peeling element allows a product to be peeled in the same peeling device in such a way that the rough scraping surface of the peeling element starts the peeling and the cutting means of the peeling element finishes the peeling. When peeling is started with the rough scraping surface, the cutting means does not come into contact with sand or the like impurities. The most important advantages of the peeling element and the peeling device of the invention include a reduction in the costs of the peeling apparatus and the space required by it, since they allow a product to be peeled in a single peeling device.

The peeling element of the present invention may be composed of a single part with a combination of a carborundum surface and knives. An alternative is a two-piece peeling element composed of a first part comprising a carborundum surface and a second part comprising knives. In this case the two parts are coupled together, both parts being for example hollow, allowing them to be threaded on a common shaft for making them rotate together.

In a preferred embodiment, the peeling device comprises a worm conveyor for moving the product to be peeled from the rough scraping surface of the peeling element towards its knives. This allows the peeling device to be made entirely automatic, i.e. it is capable of receiving a peelable product from an inlet, peeling the product and moving the ready-peeled product to an outlet.

In the following the invention will be described in greater detail by means of examples with reference to the attached figures.

DETAILED DESCRIPTION OF THE INVENTION

Figure 1:
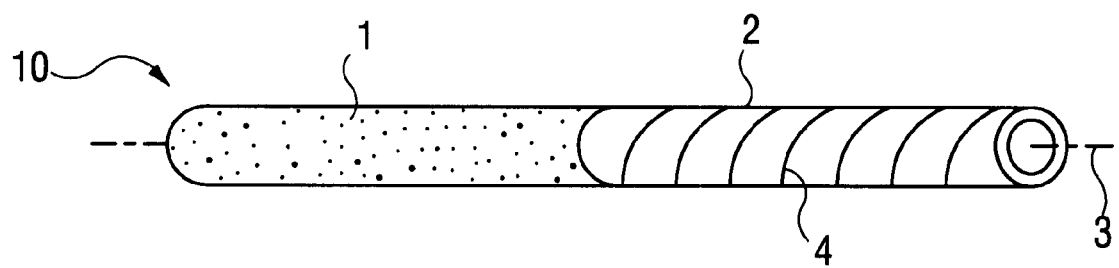
FIG. 1 shows an embodiment of a peeling element of the invention.
Figure 5:
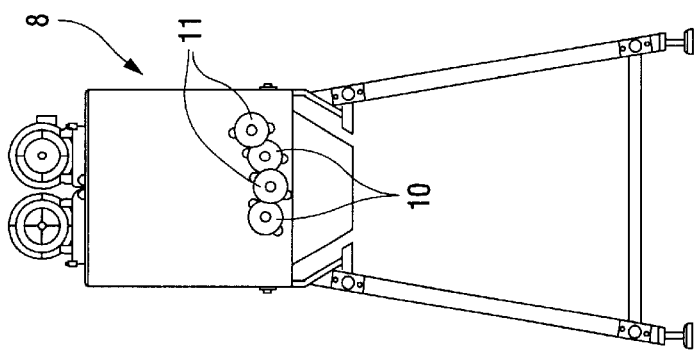
FIG. 5 is a left end view of the device shown in FIG. 2.
Figure 4:
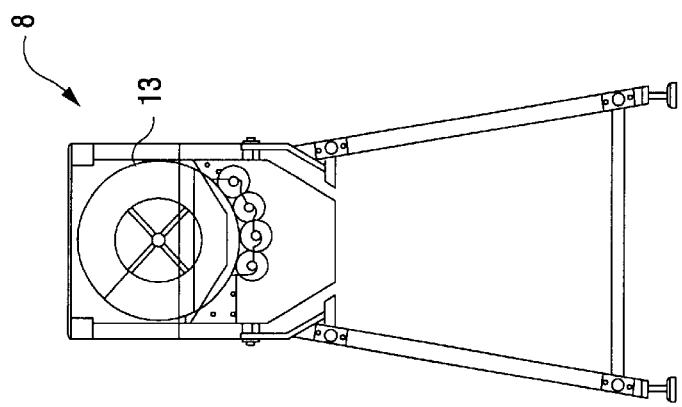
FIG. 4 is a right end view of the device shown in FIG. 2.

FIG. 1 shows an embodiment of a peeling element 10. The peeling element 10 is spoke-shaped. When used for peeling of a product, the peeling element 10 is rotated around a rotation axis 3, which in FIG. 1 coincides with the mid axis of the rod-like element.

At a first end 1 of the peeling element its outer surface comprises a rough scraping surface. The scraping surface may be composed of carborundum, for example.

A second end 2 of the peeling element 10 comprises at least one cutting means 4. The cutting means may be implemented for example by one or more grooves being milled in the outer surface of the peeling element, the edges of the groove providing the cutting means 4. An alternative is that only the knife of the cutting means projects from the surface of the peeling element, i.e. material is removed from the surface of the peeling element between the knife of the cutting means such that only the blade projects from the surface of the peeling element.

For the sake of clarity, FIG. 1 only shows one helical cutting means 4 extending in a direction substantially different from the direction of the rotation axis 3 of the peeling element. In practice, the number of helical cutting means may be larger and the cutting means may be arranged substantially more densely in the longitudinal direction of the peeling element.

The peeling element 10 may be composed of only a single part that is so processed that its first end 1 is provided with a rough scraping surface of e.g. carborundum and its second end 2 with at least one cutting means 4. Alternatively, the peeling element may be composed of two separate elements coupled together, the outer surface of one element comprising the rough scraping surface and the other element comprising a cutting means. Such a construction allows continuous use of the part comprising the rough scraping surface, even though the part comprising the cutting means is replaced (e.g. when it has become blunt).

The length of the carborundum-covered part of the peeling element may also differ from the length of the part comprising the cutting means. This allows the relationship between peeling the product by scraping and peeling the product with knives to be changed.

FIGS. 2–5 show an embodiment of a hollow peeling element 10 incorporated into a peeling device 8. The hollow peeling element is threaded on a shaft 6 (see FIG. 3) that is longer than the peeling element. Hereby the shaft projects from both ends of the peeling element. The projecting parts of the shaft are coupled to the means that are utilized for rotating the peeling element. If the peeling element is composed of two separate parts (one comprising a carborundum surface and the other knives), then these parts can be coupled together simply by threading them on a common shaft.

Figure 2:
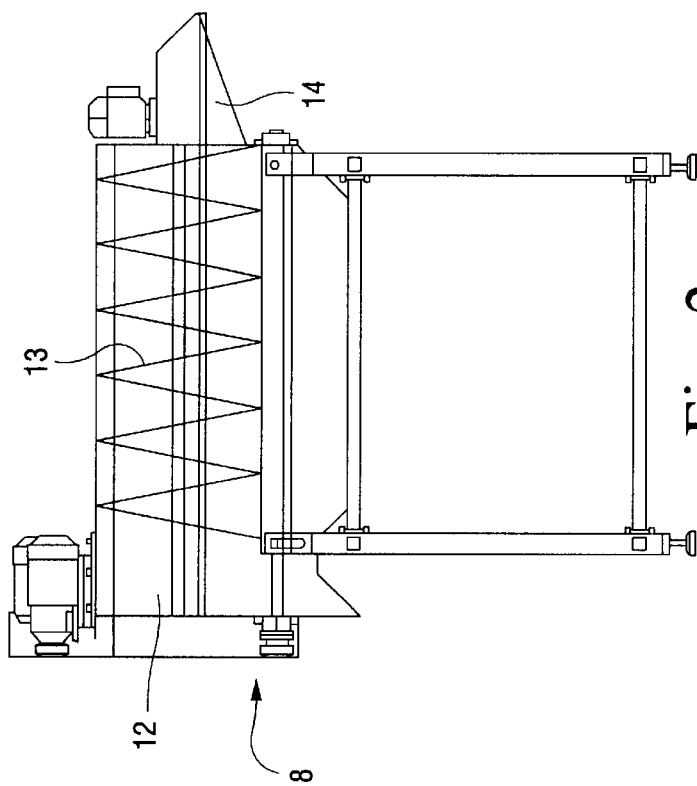
FIG. 2 shows a side elevation of a peeling device of the invention incorporating a plurality of the peeling elements shown in FIG. 1.
Figure 3:
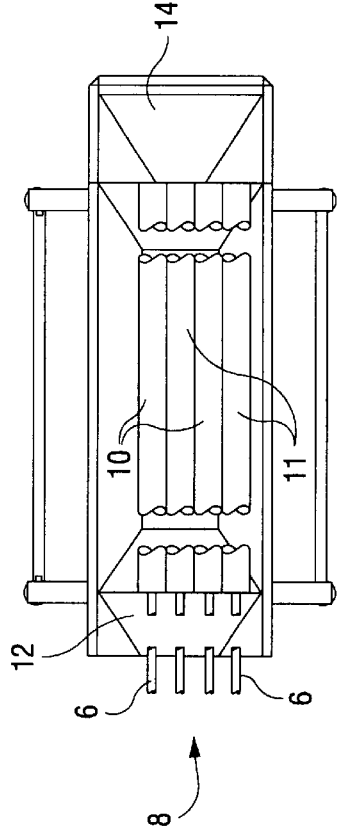
FIG. 3 is a bottom plan view of the device shown in FIG. 2.

FIG. 2 shows an embodiment of a peeling device of the invention. The peeling device of FIG. 2 utilizes a plurality of the peeling elements shown in FIG. 1. FIG. 2 shows side and top views of the peeling device, and a view from both of its short sides.

The structures of the peeling elements 10 and 11 in FIG. 2 correspond to that of the peeling element shown in FIG. 1. However, because the peeling elements in FIG. 2 rotate at different speeds, they are denoted by different reference numbers 10 and 11. The peeling element denoted by reference number 10 is preferably rotated at 1,400 rpm, and the peeling element denoted by reference number 11 at 200 rpm. The diameter of the peeling element is for example about 90 mm.

The peeling device 8 in FIGS. 2–5 comprises an inlet 12 wherein the products (e.g. potatoes) to be peeled are applied. The products are thus disposed above the rotating peeling elements 10 and 11, and are thus initially in contact with the carborundum surface at the first end 1 of the peeling elements 10, 11. The peeling device 8 further comprises a worm conveyor 13 arranged in the vicinity of the surface of the peeling elements 10, 11. During peeling, the worm conveyor 13 rotates in a direction that makes the products move from the inlet 12 towards the outlet 14, i.e. from the carborundum surface of the peeling elements 10, 11 towards the end 2 of the peeling elements that comprises the cutting means: Finally the worm conveyor 13 discharges the ready-peeled products at the outlet 14 of the peeling device.

The peeling device 8 may also be utilized with other peeling elements than are shown in FIG. 1. Instead of a combination of a carborundum surface and knives, peeling elements comprising only knives or only a carborundum surface may be utilized.

It is to be understood that the above description and the figures are only intended to elucidate a preferred embodiment of the invention. Consequently, the embodiments of the present invention may vary within the scope of the attached claims.

What is claimed is:

1. A peeling element having an elongated shape and being attached to means for rotating the peeling element around a rotation axis the peeling element comprising peeling means on an outer surface, wherein on a first part of said peeling element said outer surface comprises a rough scraping surface, and on a second adjacent part of said peeling element said outer surface comprises at least one cutting means.

2. A peeling element as claimed in claim 1, wherein said rough scraping surface is composed of carborundum.

3. A peeling element as claimed in claim 1, wherein said second part of the peeling element comprises grooves whose edges provide said cutting means.

4. A peeling element as claimed in claim 1, wherein said cutting means extends in a direction that is substantially different from the direction of said rotation axis.

5. A peeling element as claimed in claim 1, wherein the peeling element consists of sleeves arranged on a common rotation axis, at least a first sleeve comprising said rough scraping surface, and a second sleeve comprising said cutting means.

6. A peeling device comprising:

at least a pair of adjacent peeling elements having an elongated shape and being attached to means for rotating the peeling elements around rotation axes, the outer surfaces of the peeling elements comprising peeling means, wherein on a first part of the peeling elements the outer surface of the peeling elements comprises a rough scraping surface, and on a second part of the peeling elements the outer surface of the peeling elements comprises at least one cutting means.

7. A peeling device as claimed in claim 6, wherein said rough scraping surface is composed of carborundum.

8. A peeling device as claimed in claim 6, wherein said second part of the peeling elements comprises grooves whose edges provide said cutting means.

9. A peeling device as claimed in claim 6, wherein at least one peeling element comprises a cutting means extending in a direction that is substantially different from the direction of said rotation axis.

10. A peeling device as claimed in claim 6, wherein the peeling device comprises a conveyor for moving a peelable product along said peeling elements from the first part of the peeling elements towards the second part of the peeling elements.

11. A peeling device as claimed in claim 10, wherein said conveyor is provided by a worm conveyor.

* * * * *

UNITED STATES PATENT AND TRADEMARK OFFICE
CERTIFICATE OF CORRECTION

PATENT NO. : 6,389,963 B2
DATED : May 21, 2002
INVENTOR(S) : Engelholm

It is certified that error appears in the above-identified patent and that said Letters Patent is hereby corrected as shown below:

<u>Title page,</u>
Item [73], Assignee: delete "Oy Formit Foodprocessing AB (FI)" and insert
-- Oy Formit Foodprocessing AB, Närpes (FI). --

Signed and Sealed this

Fifteenth Day of October, 2002

Attest:

Attesting Officer

JAMES E. ROGAN
Director of the United States Patent and Trademark Office